Patented June 10, 1952

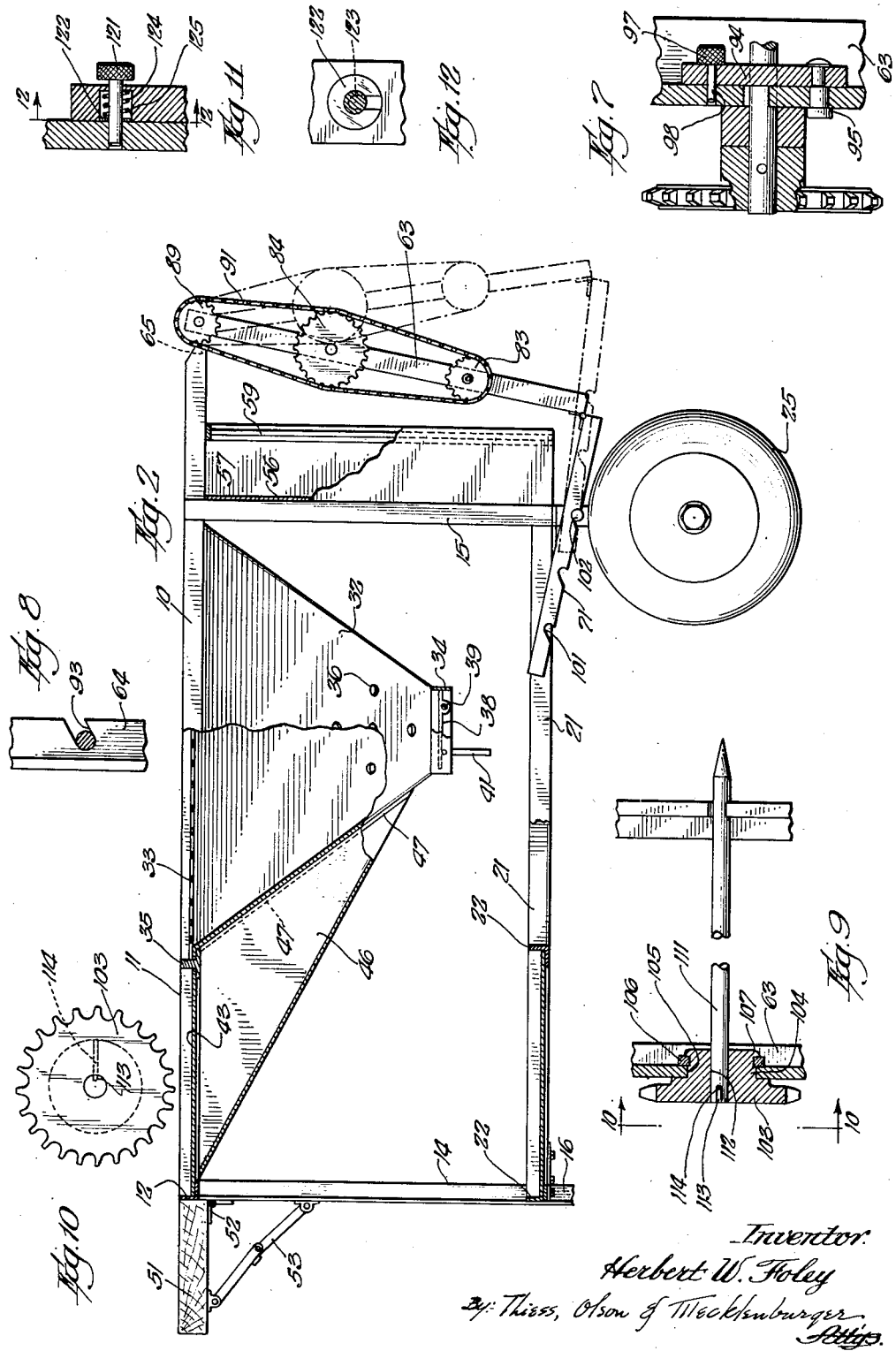

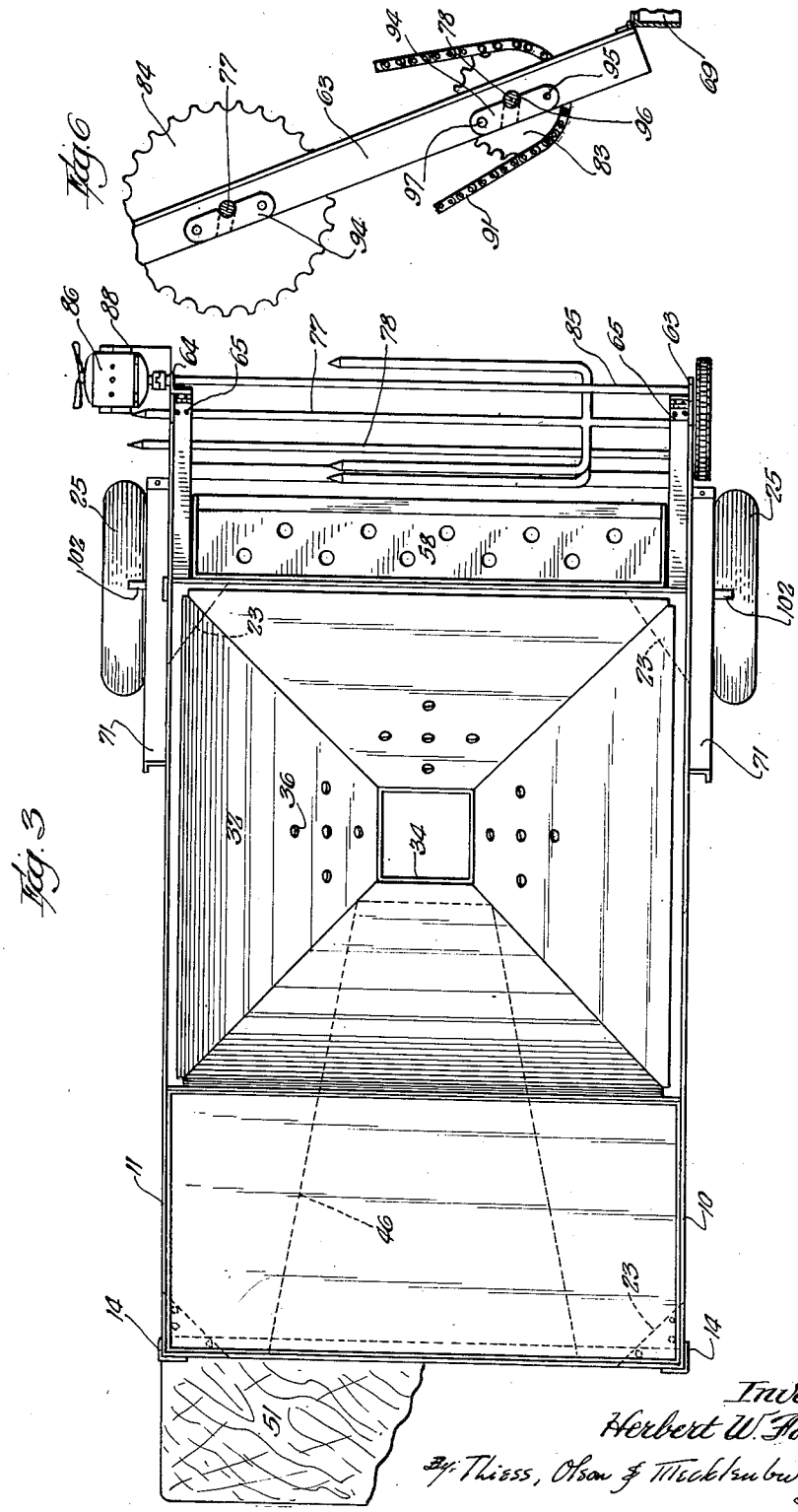

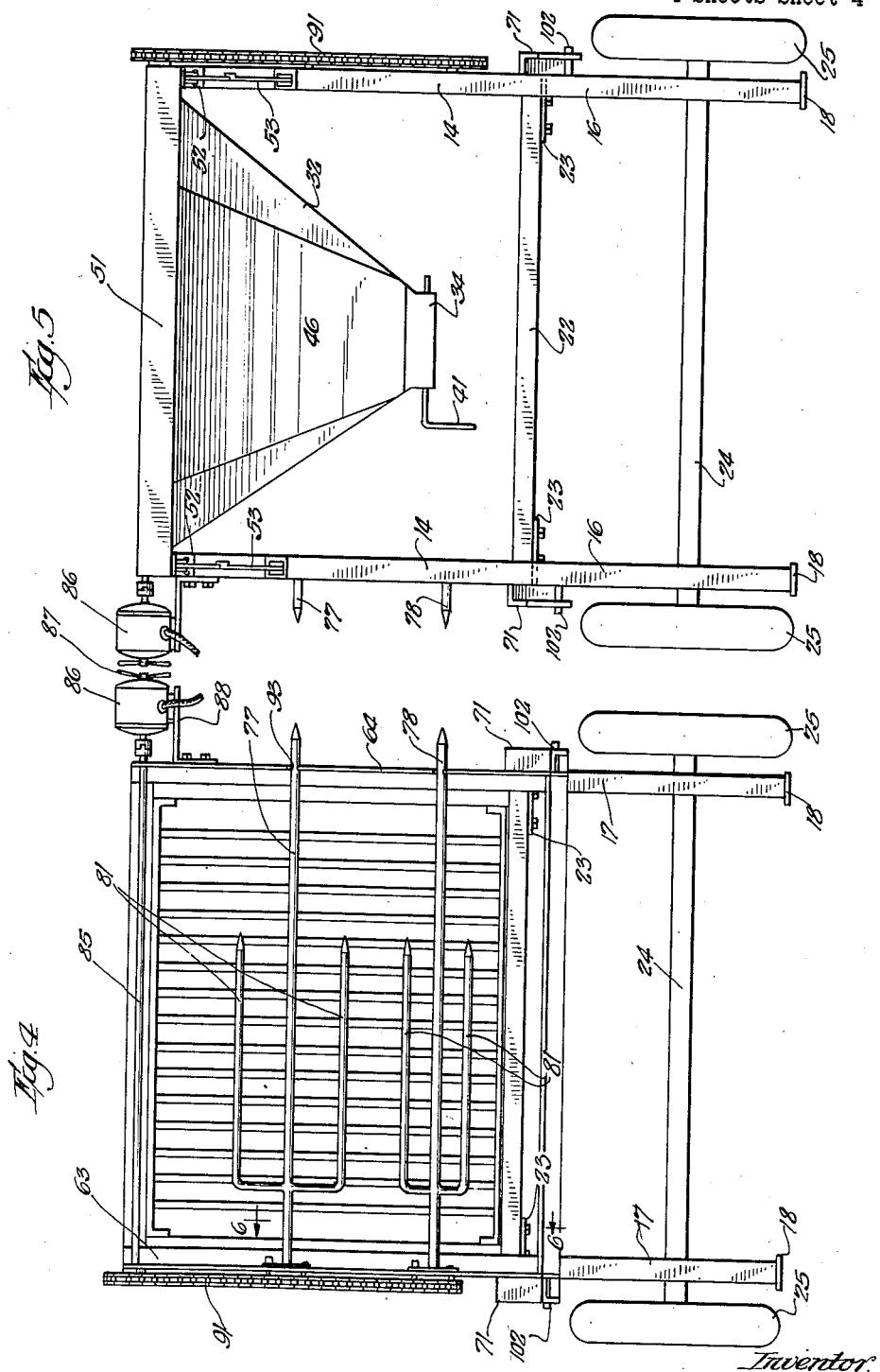

2,600,234

UNITED STATES PATENT OFFICE 2,600,234

PORTABLE BROILER

Herbert W. Foley, Kenilworth, Ill.

Application June 8, 1946, Serial No. 675,424

1 Claim. (Cl. 99—421)

This invention relates to a food broiler. More particularly it has reference to a portable broiler for outdoor use, and wherein food may be broiled while disposed on a horizontal grill or on spits rotating before a vertical fuel bed, the apparatus including a table for warming the cooked food.

Portable broilers heretofore available have been no more or less than simple grates mounted on a wheeled frame. Hostesses are finding that open-air entertaining including so-called barbecued preparation of meat and fowl meets with heartier response from guests than more formal parties much in vogue in years gone by. Accordingly, many types of equipment for open-fire cooking or barbecues have been offered on the market, but all suffer from lack of flexibility.

It will be recognized that certain flat cuts of meat—for example steaks, chops, and pork ribs—are best prepared by depositing them on a horizontally disposed grill placed over a bed of live coals or charcoal. Other comestibles, e. g., whole or pieces of fowl, or loins, are best prepared by impalement on a spit, and the slow rotation of the spit in front of a vertically disposed fuel bed in order to subject the meat to a slower rate of cooking. Moreover, it is decidedly advantageous to provide in connection with a portable broiler a warming table for maintaining the heat in the cooked food until served, or for warming the plates.

Insofar as the broiling of whole fowl or of large cuts of meat, e. g., loins of beef or pork, is concerned, it is highly desirable to accelerate the rate of cooking at first in order to sear the meat and retain the juices therein, and then to decelerate the cooking rate while the inside portions of the meat are properly cooked, and without overdoing the surface layer. Thus it is advantageous to provide a broiler having means for readily bringing the meat closer to or farther away from the fire and temporarily maintainable in the selected position without requiring the constant attention of the chef.

Another desirable feature for an outdoor broiling apparatus consists in providing simple and reliable means for rotating the spits, such means being of a kind requiring little or no lubrication to eliminate the possibility of contamination of the food by the lubricant, and simple enough so that repairs may be made by a householder having only basic tools.

With the foregoing in view a principal object of my invention is the provision of a portable broiling apparatus including a horizontal grill and a hopper for holding a fuel bed therebeneath, together with a vertical chamber and grate providing a vertical fuel bed, there being a spit-holding frame before the vertical bed.

A further object is to provide a hopper as aforesaid of tapered form, the area of smaller cross-section being lowest and the lower zone being adapted to contain the fire, there being a perforate grill over the upper, larger end for supporting the product being broiled. Thus a maximum cooking temperature prevails in the central part of the grill, directly over the fire, and the temperature decreases gradually from the center to the periphery of the grill.

Another object is to provide a broiler having a vertical fuel bed and a spit-holding frame in front of the same, the frame being adjustable with respect to the fuel bed to position the food being cooked close to or away from the fire.

A further object is to provide an adjustable spit-supporting rack as aforesaid hingedly connected to the framework of the apparatus and including members to adjustably secure the unhinged side of the rack to the framework in any of a plurality of selected positions to vary the position of the comestibles with respect to the fuel bed during broiling thereof.

Still another object is to provide an adjustable spit-supporting rack as aforesaid having rotatable spits and means for rotating the same, the rotating means being carried entirely on the rack, and hence, movable with it to its plurality of adjusted positions.

An additional object is to provide an adjustable spit-supporting rack hingedly connected to the framework of the apparatus at one side, and having members co-operating with elements on the framework for temporarily securing the rack in any of a plurality of adjusted positions, these members being utilizable as legs to support the rack in a substantially horizontal position with the spitted meat out of the cooking zone.

Another object is to provide a broiling apparatus having a hopper to contain the fuel bed and a duct juxtaposed exteriorly of the hopper wall, there being a food-warming table at the open end of the duct whereby the heated air rising in the duct maintains a warm condition of the table.

Other objects will appear from the following description.

In the drawings, which show a preferred form of my invention:

Fig. 2 is a front elevational view thereof;

Fig. 3 is a plan view thereof;

Fig. 4 is a right-side elevational view thereof;

Fig. 5 is a left-side elevational view thereof;

Fig. 6 is a detail view taken on the line 6—6 of Fig. 4;

Fig. 7 is a detail in cross section taken on the line 7—7 of Fig. 6;

Fig. 8 is a detail of a spit-receiving slot;

Fig. 9 is a detail view of an alternative form of spit and its driving sprocket;

Fig. 10 is a detail view taken on the line 10—10 of Fig. 9;

Fig. 11 is a cross-sectional detail of one form of spit-retaining latch; and

Fig. 12 is a detail view, somewhat enlarged, taken on the line 12—12 of Fig. 11.

Figure 1:
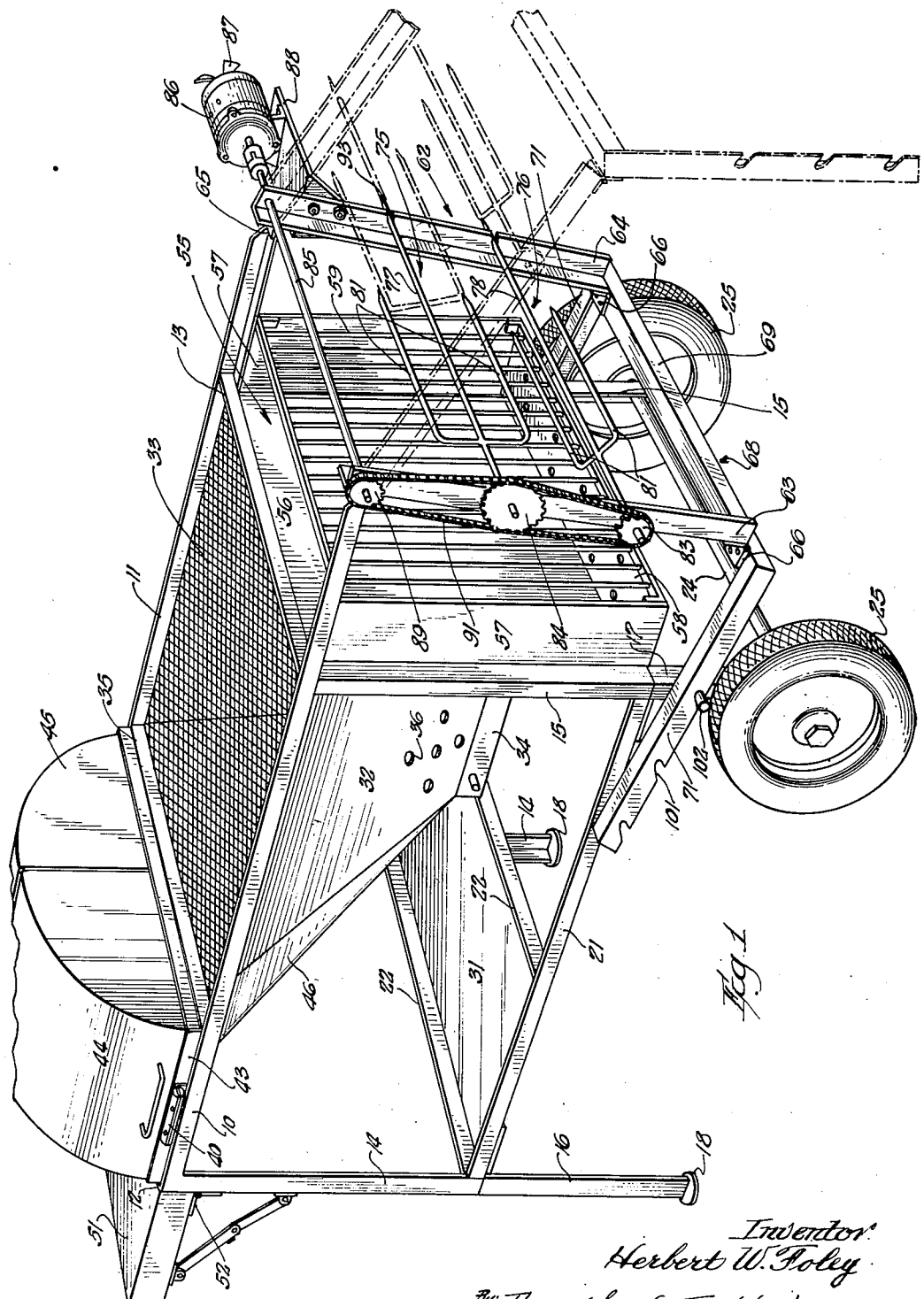
Fig. 1 is a perspective view of one form of broiler embodying my invention.

Referring first to Figs. 1 to 5, the portable broiler there shown comprises a framework including top side bars 10 and 11 joined by end bars 12 and 13, as by welding, to form a rectangular upper frame portion, the several members being preferably of angle iron with one leg vertical and the other leg disposed horizontally inwardly. At the welded junctions aforesaid are similarly attached the four vertical members 14—14 and 15—15, each continuing in legs 16—16 and 17—17, respectively, the legs 16—16 terminating in feet 18—18 adapted to rest on the ground. For transverse stiffening, the struts 21—21 and 22—22 are provided, to which are attached the bolted gussets 23 in turn welded to the top of the legs 16—16 and 17—17. Thus the legs are detachable for ease in packing and shipment. At the lower end of the legs 17 there is fixed an axle 24 upon the ends of which the rubber-tired wheels 25—25 are arranged for rotation. The framework just described is thus easily moved from place to place by grasping the framework at the left-hand end in an obvious manner.

The space intermediate the struts 21—21 and 22—22 is occupied by a utility shelf 31 which is supported by the inwardly directed legs of the struts, the shelf being fixed or removable as desired, and adapted for holding knives, forks and other cooking implements.

For the broiling of comestibles such as hamburgers, steaks, chops and like items not ordinarily cooked en brochette, the fuel hopper 32 and grill 33 are provided. Hopper 32 comprises an inverted frusto-pyramidal structure of sheet steel joined at the corners in any convenient manner and terminating at the lower open end in a rectangular rim 34, the hopper structure being joined to the members 10, 11, 13, and an intermediate T-strut 35. To permit draft to the fuel bed, holes 36 may be provided in the hopper walls. Grill 33 is of woven wire mesh, parallel iron rods set into a frame, or any equivalent open structure suitable for the purpose, the same being loosely set into the framework. Moreover, the grill 33 may be provided with a handle (not shown) for ready removal and the adding of fuel to the fire. For dumping the ashes, a leaf 38 (Fig. 2) hinged at 39 to the rim 34 is provided, the leaf being maintained in closed position by an L-shaped latch 41 inserted through apertures in the rim. Release of the leaf 38 may be rapidly effected by withdrawal of the latch 41, the weight of the leaf and the ashes then opening the leaf.

By the use of an inverted frusto-pyramidal hopper 32, it is possible to form a fuel bed having a substantially lesser area than the area of the grill 33. Accordingly, by placing thicker cuts of meat in the center of the grill, and the thinner cuts near the border thereof, regulated broiling may be accomplished, the temperature at the grill diminishing from the central zone thereof toward the perimeter. It is to be understood, however, that it is not intended to limit the configuration of the hopper to frusto-pyramidal since a frusto-conical form will serve equally well.

After broiling the cuts of meat, it is usually desirable to keep them warmed until serving time, or to keep the plates warm. Accordingly, I provide a flat sheet steel warming tray 43 having an upturned rim and loosely supported on the members 10, 11, 12, and 35, together with a roll cover 44 and hood 45 of conventional construction. The warming oven so comprised is rendered portable by means of handles 40 at each end thereof, only one of the latter being visible in Fig. 1. In order to direct heat most effectively to the table 43, a duct 46 is provided, the same comprising sheet metal, cut, bent and tapered as shown, the juxtaposed wall of the hopper 32 forming one wall of the duct and the two sides of the duct being bent outwardly as at 47—47 and attached to said wall. The upper end of the duct opens below the table 43 and is substantially co-extensive therewith. Thus heat transmitted through the adjacent wall of the hopper will raise the temperature of the air in the duct, which in turn rising, maintains the table 43 at food-warming temperature.

I may also provide a cutting table 51 of hardwood, hinged at 52—52 to the members 14—14 and equipped with foldable braces 53—53 of a common type whereby the table 51 may be folded downwardly out of the way.

One of the principal features of my invention resides in the vertical broiler and food-supporting means now to be described. It will be recognized that certain types of meat, e. g., chickens, whole loins, and the like, require slow cooking and hence some time while requiring little or no attention, provided of course that basting of the meat is not neglected. With these desiderata in view, I have provided, as part of my apparatus, a spit-supporting frame co-operatively associated with a vertical broiler, the direction and speed of rotation of the spits being such as to render the meat self-basting.

Thus I provide a vertically-disposed fuel chamber 55 including an imperforate side wall 56, imperforate end walls 57, a perforate bottom wall 58 to serve as a grate, and a grill 59 of parallelly spaced bars, within which chamber charcoal, coal briquettes, or similar fuel is received for burning, the effective face of the fuel bed being exposed by the grill 59. The chamber 55 is suitably attached by riveting or welding to the main framework of the apparatus as shown. Disposed in front of the grill 59 is the angularly adjustable frame 62 including the vertical or side members 63 and 64 hinged at 65—65 to the framework members 10 and 11 respectively. Hingedly connected at 66—66 to the members 63 and 64, respectively, is the three-part brace 68 including a transverse member 69 and lateral members 71—71, the hinges at 66—66 together with member 69, and the hinges at 65—65 together with the framework members 10 and 11, lending proper vertical rigidity to the members 63 and 64. From the preceding description, it will be apparent that frame 62 may be swung angularly with respect to the chamber 55, and that the brace 68 may be swung angularly with respect to the frame 62, and as indicated by dotted lines in Fig. 1.

Where in this description and the claims I use the word "frame," I intend to comprehend thereby the members 63 and 64 and the transverse strut 69 effective to space the said members, it being understood that I may, if desired, constitute the spit-holding frame 62 of a pair of vertically disposed members, such as 63 and 64, rigidly spaced apart by parallel transverse members secured thereto. In the latter event the braces 71 may be independently hingedly attached to the lower outer corners of the frame, and either the upper ends of the members 63 and 64 or the transverse strut joining said upper ends may be hinged to the main framework of the apparatus, the object in the instant respect being the provision of a rigid spit-supporting frame adapted for angular adjustment with respect to the vertical fuel bed.

A plurality of meat-holding spits 75 and 76 are provided, each including shaft portions 77 and 78 respectively, and parallelly positioned sharp-pointed skewer portions 81. Shafts 77 and 78 are likewise sharpened to permit meat cuts to be impaled thereon. In order to accommodate different sizes of cuts, the portions 81 of one spit, e. g., 75, are spaced are spaced farther away from the shaft 77 than the corresponding elements of the spit 76. Shafts 77 and 78 are secured to sprockets 83 and 84, the latter being of larger pitch diameter for a purpose to appear. Located above the spits 75 and 76 is the drive shaft 85 rotatable in apertures in the members 63 and 64, and coupled to a gear-reduction electric motor 86 of a well-known type, the motor carrying a cooling fan 87 at the outboard end thereof. Motor 86 is attached to a shelf 88 secured to member 64. A sprocket 89 affixed to the forward end of the shaft 85 drives a chain 91 in mesh with the sprockets 83 and 84, the latter being larger as mentioned to afford substantial arcs of contact of the chain 91 with the periphery thereof.

Spits 75 and 76 are removably supported in the frame 62 by engagement in inclined notches 93 (Fig. 8). Thus it is a simple matter to remove a spit from the frame for charging or discharging the meat, the sprockets 83 and 84 being easily disengageable and re-engageable with the chain 91. Spits 75 and 76 being independently driven, the spit 75 may be omitted without disturbing the drive of the other spit. To insure maintenance of the shafts 77 and 78 in their associated notches 93, I prefer to provide latches (Figs. 6 and 7) comprising a flat plate 94 pivoted at 95 to the member 63, and having a semicircular notch 96 partially embracing shaft 77 or 78, the latch being releasable and lockable by means of a sliding pin 97 engageable in an aperture 98 in the member 63. To release a spit, the pin 97 is withdrawn and plate 94 swung outwardly to free the spit for removal as aforesaid.

I have found that for best results, the drive shaft 85 should be rotated clockwise, as viewed from the front of the apparatus, at approximately two revolutions per minute, such direction of rotation resulting in a self-basting action. That is to say, by rotating the cooked zone of a cut away from the fire, the juices thus forced to the surface at the place of highest temperature will trickle back over the zone then approaching the fire to produce an ideal basting condition.

In order to position the meat at the optimum spacing from the fuel bed in the chamber 57, the frame 62 may be adjustably secured in a plurality of angular positions by engaging any corresponding pair of a plurality of notches 101 in the members 71 with the posts 102 secured in members 15. To change such angular adjustment the hinged brace 68 may be lifted and a different pair of notches 101 utilized. When it is desired to strip the cooked meat from the spits 81 or to charge them, the frame 62 may be swung its maximum distance angularly and the brace 68 employed as legs as clearly depicted by dotted lines in Fig. 1. In that manner the heat of the fire is of no discomfort to the cook.

Moreover, the adjustability of the frame 62 allows clearance for the broiling of large cuts of meat while permitting smaller cuts to be brought closer to the fire.

An alternate form of spit and sprocket connection is shown in Figs. 9 and 10, in which the sprocket 103 corresponds to either of the sprockets 83 and 84 of the embodiment above described. A hub 104 is rotatable in an aperture 105 in the member 63 and the sprocket, after assembly, is axially retained by a ring 106 secured by a peened-over portion of the hub 104. The spit shaft 111 fits within an aperture 112 in the sprocket 103, and intermating keyway 113 and pin 114 provide a driving connection between the sprocket and shaft. With this form of the spit mechanism it is unnecessary to disturb the sprocket with respect to its chain when removing a spit, the shaft 111 being axially slidable out of driving engagement and similarly re-engageable.

In Figs. 11 and 12 is shown a modified locking pin for the latch plate 94. In this case the pin 121 is provided with an integral horseshoe washer 122 engaged over an annular groove 123 therein, the washer retaining a compression spring 124. An aperture 125 receives the washer and spring. Thus the pin 121 is secure against loss and is self-engageable after restoration of a plate 94 to locking position.

While I have shown particular embodiments of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

A broiler comprising in combination a walled heating chamber including at least one vertically disposed perforate wall, a pair of spaced apart bars of substantially equal length hingedly connected at their upper ends to the upper part of said chamber and adjacent said perforate wall, said bars being of a length substantially equal to the height of the perforate wall, a food carrying member mounted on said bars, a horizontal strut connected to the lower ends of said bars and forming with said bars a frame structure adapted for movement as a unit to varying positions of adjustment with relation to said perforate wall, a combined brace and leg member hingedly connected to the free end of said frame structure and of a length substantially equal to the length of said bars, and cooperating holding means on the chamber and on the combined brace and leg member for adjustably holding the frame structure and its food carrying member within cooking range of said heating chamber, said combined brace and leg member when released from its holding relation with said heating chamber swinging about its hinged connection and positionable as a supporting leg for the food carrying frame structure when said frame structure is angularly disposed substantially at a right angle to the perforate wall of said heating chamber and in warming or non-cooking position with respect to said perforate wall.

HERBERT W. FOLEY.

REFERENCES CITED

The following references are of record in the file of this patent:

UNITED STATES PATENTS

| Number | Name | Date |
|---|---|---|
| 47,176 | Wetmore | Apr. 4, 1865 |
| 501,867 | Cacciatori | July 18, 1893 |
| 839,236 | Vartanian | Dec. 25, 1906 |
| 902,724 | Giovanna | Nov. 3, 1908 |
| 1,266,853 | Peterson | May 21, 1918 |
| 1,442,584 | Schey | Jan. 16, 1923 |
| 1,554,645 | Morris | Sept. 22, 1925 |
| 1,605,143 | Renfroe | Nov. 2, 1926 |
| 1,702,900 | Humphrey | Feb. 19, 1929 |
| 1,719,713 | Miller | July 2, 1929 |
| 1,853,319 | Polhemus | Apr. 12, 1932 |
| 1,893,454 | Stolzenburg et al. | Jan. 3, 1933 |
| 2,122,275 | Bitney | June 28, 1938 |
| 2,130,259 | Bonaguidi | Sept. 13, 1938 |
| 2,154,165 | Huntington | Apr. 11, 1939 |
| 2,164,835 | Pearson et al. | July 4, 1939 |
| 2,239,500 | Duke | Apr. 22, 1941 |
| 2,388,831 | Cramer | Nov. 13, 1945 |
| 2,482,068 | Larson | Sept. 13, 1949 |